(12) United States Patent
Boch et al.

(10) Patent No.: US 9,130,730 B1
(45) Date of Patent: *Sep. 8, 2015

(54) APPARATUS AND METHODS FOR AGGREGATION OF COMMUNICATION BANDWIDTH OVER MULTIPLE WIRELESS COMMUNICATION LINKS

(75) Inventors: Erik Boch, Ottawa (CA); Prakasha Aithal, Kanata (CA); Justin L. Wintour, Ottawa (CA)

(73) Assignee: DRAGONWAVE, INC., Kanata, ON (CA)

( * ) Notice: Subject to any disclaimer, the term of this patent is extended or adjusted under 35 U.S.C. 154(b) by 254 days.

This patent is subject to a terminal disclaimer.

(21) Appl. No.: 13/529,827

(22) Filed: Jun. 21, 2012

Related U.S. Application Data (63) Continuation of application No. 12/457,286, filed on Jun. 5, 2009, now Pat. No. 8,213,306.

(51) Int. Cl.
| | |
|---|---|
| *H04L 1/00* | (2006.01) |
| *H04L 12/801* | (2013.01) |
| *H04W 28/08* | (2009.01) |
| *H04L 12/709* | (2013.01) |
| *H04L 12/891* | (2013.01) |
| *H04L 12/803* | (2013.01) |

(52) U.S. Cl.
CPC ............ *H04L 1/0084* (2013.01); *H04L 45/245* (2013.01); *H04L 47/10* (2013.01); *H04L 47/125* (2013.01); *H04L 47/41* (2013.01); *H04W 28/08* (2013.01)

(58) Field of Classification Search
CPC ....... H04L 47/10; H04L 47/125; H04L 47/41; H04L 45/245; H04W 28/08

USPC ............ 370/229, 230, 230.1, 231, 232, 235, 370/542; 455/450, 453

See application file for complete search history.

(56) References Cited

U.S. PATENT DOCUMENTS 5,625,877 A * 4/1997 Dunn et al. ................... 455/454
5,940,454 A * 8/1999 McNicol et al. .............. 375/347

(Continued)

OTHER PUBLICATIONS

Non-final Office Action for U.S. Appl. No. 12/457,286 dated Feb. 14, 2011; 20 pages.

(Continued)

*Primary Examiner* — Chi H Pham
*Assistant Examiner* — Robert Lopata (57) ABSTRACT

Fixed-length communication traffic blocks, for transmission over a wireless communication link, are generated from communication traffic that is received at a primary communication apparatus. The generated blocks are distributed between a first wireless communication link associated with the primary apparatus and a second wireless communication link associated with a secondary apparatus, for transmission of the communication traffic blocks over the first and second wireless communication links. The distribution of the communication traffic blocks is through an inter-apparatus communication link between the primary and secondary apparatus. Communication traffic blocks that are received over the second wireless communication link are transferred to the primary apparatus through the inter-apparatus communication ink and combined, with blocks that are received on the first wireless communication link, into a communication traffic stream. One or more secondary wireless communication links may be provided by one or more respective installations of secondary apparatus.

18 Claims, 5 Drawing Sheets

(56) References Cited

U.S. PATENT DOCUMENTS

| | | | |
|---|---|---|---|
| 6,738,360 B1* | 5/2004 | Lewis et al. | 370/310.1 |
| 6,842,446 B2* | 1/2005 | Everson et al. | 370/349 |
| 6,862,272 B2* | 3/2005 | Dulin et al. | 370/330 |
| 6,862,440 B2* | 3/2005 | Sampath | 455/276.1 |
| 6,907,048 B1* | 6/2005 | Treadaway et al. | 370/474 |
| 6,934,266 B2* | 8/2005 | Dulin et al. | 370/310.1 |
| 6,937,580 B2* | 8/2005 | Heatwole et al. | 370/322 |
| 7,136,619 B2* | 11/2006 | Zhang | 455/11.1 |
| 7,142,864 B2* | 11/2006 | Laroia et al. | 455/450 |
| 7,286,853 B2* | 10/2007 | Meier | 455/560 |
| 7,308,015 B2* | 12/2007 | Takano et al. | 375/130 |
| 7,397,804 B2* | 7/2008 | Dulin et al. | 370/395.4 |
| 7,412,245 B2* | 8/2008 | Guo | 455/453 |
| 7,539,175 B2* | 5/2009 | White et al. | 370/350 |
| 7,623,455 B2* | 11/2009 | Hilla et al. | 370/232 |
| 7,684,355 B2* | 3/2010 | Meier et al. | 370/256 |
| 7,729,257 B2* | 6/2010 | Kodialam et al. | 370/235 |
| 7,756,029 B2* | 7/2010 | Licardie et al. | 370/230.1 |
| 8,107,457 B2* | 1/2012 | White et al. | 370/350 |
| 8,264,959 B2* | 9/2012 | Licardie et al. | 370/230.1 |
| 8,693,308 B2* | 4/2014 | Hourtane et al. | 370/216 |
| 2006/0142021 A1* | 6/2006 | Mueckenheim et al. | 455/453 |
| 2006/0182152 A1* | 8/2006 | Bi et al. | 370/542 |
| 2007/0147424 A1* | 6/2007 | Anigstein | 370/469 |
| 2008/0095048 A1* | 4/2008 | Zhong | 370/229 |
| 2008/0232383 A1* | 9/2008 | Meier et al. | 370/401 |
| 2010/0130241 A1* | 5/2010 | Kitaji | 455/509 |
| 2010/0215058 A1* | 8/2010 | Yakov et al. | 370/475 |
| 2010/0246396 A1* | 9/2010 | Licardie et al. | 370/232 |
| 2012/0134262 A1* | 5/2012 | Licardie et al. | 370/225 |

OTHER PUBLICATIONS

Final Office Action for U.S. Appl. No. 12/457,286 dated Sep. 16, 2011; 8 pages.

Advisory Action for U.S. Appl. No. 12/457,286 dated Dec. 8, 2011; 3 pages.

* cited by examiner

APPARATUS AND METHODS FOR AGGREGATION OF COMMUNICATION BANDWIDTH OVER MULTIPLE WIRELESS COMMUNICATION LINKS

CROSS-REFERENCE TO RELATED APPLICATION

This application is a continuation of U.S. patent application Ser. No. 12/457,286 filed on Jun. 5, 2009, the entire contents of which are incorporated in their entirety herein by reference.

FIELD OF THE INVENTION

This invention relates generally to communications and, in particular, to aggregating bandwidth that is provided by multiple wireless communication links.

BACKGROUND

The growth of Ethernet as a transport medium for voice and data in a wide variety of technologies, such as Metro Ethernet Networks, is increasing the demand for the bandwidth it offers. While the use of the wireless technology in such networks is also growing because of its simplicity in installation and cost, the limited bandwidth capacity of wireless communication links is adversely affecting wide scale deployment of such technology in core networks.

In order to increase bandwidth, multiple wireless links are integrated with Ethernet switches implementing traditional load sharing or balancing techniques such as Link Aggregation control Protocol, PVSTP (Per Virtual Local Area Network (VLAN) Spanning Tree Protocol), and MSTP (Multiple STP). However, bandwidth sharing between the wireless links according to such techniques is dependent on the profile of traffic streams.

SUMMARY

According to an aspect of the invention, an apparatus includes: a block generator that receives communication traffic and generates fixed-length communication traffic blocks for transmission over a wireless communication link, the communication traffic blocks comprising the received communication traffic; a distributor, operatively coupled to the block generator, that distributes the communication traffic blocks between a first wireless communication link associated with the apparatus and a second wireless communication link associated with a further apparatus for transmission of the communication traffic blocks over the first and second wireless communication links; and a block transfer module, operatively coupled to the distributor, that enables the communication traffic blocks that are distributed to the second wireless communication link to be transferred to the further apparatus over a further communication link.

In some embodiments, the block generator receives the communication traffic over a communication link, and the communication link and the further communication link are of the same type. Where the communication link and the further communication link are respective Ethernet links, the block transfer module encapsulates the communication traffic blocks that are distributed to the second wireless communication link into Ethernet frames.

Although the received communication traffic may include header information, the distributor may distribute the communication traffic blocks between the first wireless communication link and the second wireless communication link independently of the header information.

The block generator includes a unique identifier in each of the communication traffic blocks in some embodiments.

The distributor may distribute the communication traffic blocks to load balance transmission of the received communication traffic over the first and second wireless communication links, for example.

An interface may be operatively coupled to the block transfer module to enable communications with the further apparatus over the further communication link. The interface may also enable exchange of management traffic between the apparatus and the further apparatus.

The distributor may determine an operational status of each of the first and second wireless communication links, and determine a distribution of the communication traffic blocks based on the determined operational status.

In some embodiments, the first wireless communication link is a primary wireless communication link, the second wireless communication link is one of multiple secondary wireless communication links with each secondary wireless communication link being associated with a respective further apparatus, the distributor distributes the communication traffic blocks between the first wireless communication link and the secondary wireless communication links, and the block transfer module enables the communication traffic blocks that are distributed to the secondary wireless communication links to be transferred to the further apparatus with which each of the secondary wireless communication links is associated.

The block transfer module may also enable communication traffic blocks received by the further apparatus to be transferred to the apparatus from the further apparatus over the second wireless communication link, in which case the apparatus may also include a block combiner, operatively coupled to the block transfer module, that combines communication traffic blocks that are received from the further apparatus with communication traffic blocks that are received over the first wireless communication link into a combined communication traffic stream. Where the communication block generator receives the communication traffic over a communication link, the combined communication traffic stream may be for transmission over the communication link.

The apparatus may also include a block flow controller, operatively coupled to the distributor, that controls distribution of the communication traffic blocks to the second wireless communication link by the distributor.

Such an apparatus could be implemented, for example, in a first node of a communication system, and in combination with a second node of the communication system that includes the further apparatus. In this case, the first node may also include a wireless interface that enables the communication traffic blocks that are distributed to the first wireless communication link to be transmitted over the first wireless communication link, the further apparatus may include a block transfer module that enables the communication traffic blocks that are distributed to the second wireless communication link to be received by the further apparatus over the further communication link, and the second node may further include a wireless interface, operatively coupled to the block transfer module of the further apparatus, that enables the communication traffic blocks that are distributed to the second wireless communication link to be transmitted over the second wireless communication link.

In such a combination the further apparatus may include a block generator that receives communication traffic and generates fixed-length communication traffic blocks comprising the received communication traffic; and a distributor, operatively coupled to the block generator and to the block transfer module, that distributes the communication traffic blocks between the first and second wireless communication links for transmission. The block transfer module of the further apparatus may enable the communication traffic blocks that are distributed to the first wireless communication link by the distributor of the further apparatus to be transferred to the apparatus over the further communication link, and the block transfer module of the apparatus may enable the communication traffic blocks that are distributed to the first wireless communication link by the distributor of the further apparatus to be received by the apparatus over the further communication link.

In some embodiments, the apparatus of the first node is configurable for operation in either of a primary operating mode in which the block generator of the apparatus receives communication traffic and generates fixed-length communication traffic blocks comprising the received communication traffic and the distributor of the apparatus distributes the communication traffic blocks between the first and second wireless communication links, and a secondary operating mode in which the block transfer module of the apparatus receives communication traffic blocks that are distributed to the first wireless communication link by the distributor of the further apparatus. The further apparatus of the second node may similarly be configurable for operation in either of the primary operating mode in which the block generator of the further apparatus receives communication traffic and generates fixed-length communication traffic blocks comprising the received communication traffic and the distributor of the further apparatus distributes the communication traffic blocks between the second and first wireless communication links, and the secondary operating mode in which the block transfer module of the further apparatus receives communication traffic blocks that are distributed to the second wireless communication link by the distributor of the apparatus.

One of the apparatus and the further apparatus might be configured for operation in the primary operating mode, with the other of the apparatus and the further apparatus being configured for operation in the secondary operating mode. The configurations of the apparatus and the further apparatus could be adjustable, to configure the one of the apparatus and the further apparatus for operation in the secondary operating mode and to configure the other of the apparatus and the further apparatus in the primary operating mode.

A method according to another aspect of the invention includes: receiving communication traffic at a first communication apparatus; generating fixed-length communication traffic blocks for transmission over a wireless communication link, the communication traffic blocks comprising the received communication traffic; distributing the communication traffic blocks between a first wireless communication link associated with the first communication apparatus and a second wireless communication link associated with a second communication apparatus for transmission of the communication traffic blocks over the first and second wireless communication links; transmitting the communication traffic blocks that are distributed to the first wireless communication link over the first wireless communication link; and transferring the communication traffic blocks that are distributed to the second wireless communication link to the second communication apparatus over a further communication link.

The further communication link might be an Ethernet link, in which case transferring might involve encapsulating the communication traffic blocks that are distributed to the second wireless communication link into Ethernet frames.

Even if the received communication traffic includes header information, distributing may involve distributing the communication traffic blocks between the first wireless communication link and the second wireless communication link independently of the header information.

Generating involves including a unique identifier in each of the communication traffic blocks in some embodiments.

Although other distribution schemes could potentially be used, distributing involves distributing the communication traffic blocks to load balance transmission of the received communication traffic over the first and second wireless communication links in one embodiment.

The first wireless communication link may be a primary wireless communication link, and the second wireless communication link may be one of multiple secondary wireless communication links, with each secondary wireless communication link being associated with a respective further apparatus. In this case distributing may involve distributing the communication traffic blocks between the first wireless communication link and the secondary wireless communication links, and transferring may involve transferring the communication traffic blocks that are distributed to the secondary wireless communication links to the further apparatus with which each of the secondary wireless communication links is associated.

The method may also include: receiving at the first communication apparatus, from the second communication apparatus over the further communication link, communication traffic blocks received by the second communication apparatus over the second wireless communication link; receiving communication traffic blocks over the first wireless communication link at the first communication apparatus; and combining communication traffic blocks that are received from the second communication apparatus with communication traffic blocks that are received over the first wireless communication link into a combined communication traffic stream. Where receiving the communication traffic involves receiving the communication traffic over a communication link, the combined communication traffic stream could be for transmission over the communication link.

In some embodiments, the first communication apparatus, when configured in a primary operating mode, performs the receiving, generating, distributing, transmitting, and transferring. The second communication apparatus, when configured in the primary operating mode, may similarly receive communication traffic, generate fixed-length communication traffic blocks comprising the received communication traffic, distribute the communication traffic blocks between the second and first wireless communication links for transmission, transmit the communication traffic blocks that are distributed to the second wireless communication link over the second wireless communication link, and transfer the communication traffic blocks that are distributed to the first wireless communication link to the first communication apparatus over the further communication link. When configured in a secondary operating mode, the first communication apparatus might receive communication traffic blocks that are distributed to the first wireless communication link by the second communication apparatus over the further communication link and transmit the received communication traffic blocks over the first wireless communication link. The second communication apparatus, when configured in the secondary operating mode, may similarly receive communication traffic blocks that are distributed to the second wireless communication link by the first communication apparatus over the further communication link and transmit the received communication traffic blocks over the second wireless communication link. The method might then involve configuring one of the first and second communication apparatus for operation in the primary operating mode, configuring the other of the first and second communication apparatus for operation in the secondary operating mode, and adjusting the configurations of the first and second communication apparatus, to configure the one of the first and second communication apparatus for operation in the secondary operating mode and to configure the other of the first and second communication apparatus in the primary operating mode.

Another aspect of the invention provides apparatus that includes: an interface that enables reception of communication traffic blocks over a first wireless communication link associated with the apparatus; a block transfer module that enables communication traffic blocks, that are received by a further apparatus over a second wireless communication link associated with the further apparatus, to be transferred to the apparatus from the further apparatus over a further communication link; and a block combiner, operatively coupled to the interface and to the block transfer module, that combines communication traffic blocks that are received from the further apparatus with communication traffic blocks that are received over the first wireless communication link into a combined communication traffic stream.

A related method includes: receiving communication traffic blocks over a first wireless communication link associated with a first communication apparatus; receiving at the first communication apparatus, from a second communication apparatus over a further communication link, communication traffic blocks that are received by the second communication apparatus over a second wireless communication link associated with the second communication apparatus; and combining communication traffic blocks that are received from the second communication apparatus and that comprise communication traffic of a communication traffic stream with communication traffic blocks that are received over the first wireless communication link and that comprise communication traffic of the communication traffic stream into a combined communication traffic stream.

There is also provided an apparatus including: an interface that enables communication of communication traffic blocks over a first wireless communication link; and a block transfer module, operatively coupled to the interface, that enables transfer of communication traffic blocks between the apparatus and a further apparatus over a further communication link, the communication traffic blocks and further communication traffic blocks that are communicated over a second wireless communication link associated with the further apparatus together comprising communication traffic of a communication traffic stream.

Yet another aspect of the invention provides a method that includes: communicating communication traffic blocks over a first wireless communication link associated with a first communication apparatus; and transferring the communication traffic blocks between the first communication apparatus and a second communication apparatus over a further communication link, the communication traffic blocks and further communication traffic blocks that are communicated over a second wireless communication link associated with the second communication apparatus together comprising communication traffic of a communication traffic stream.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 1:
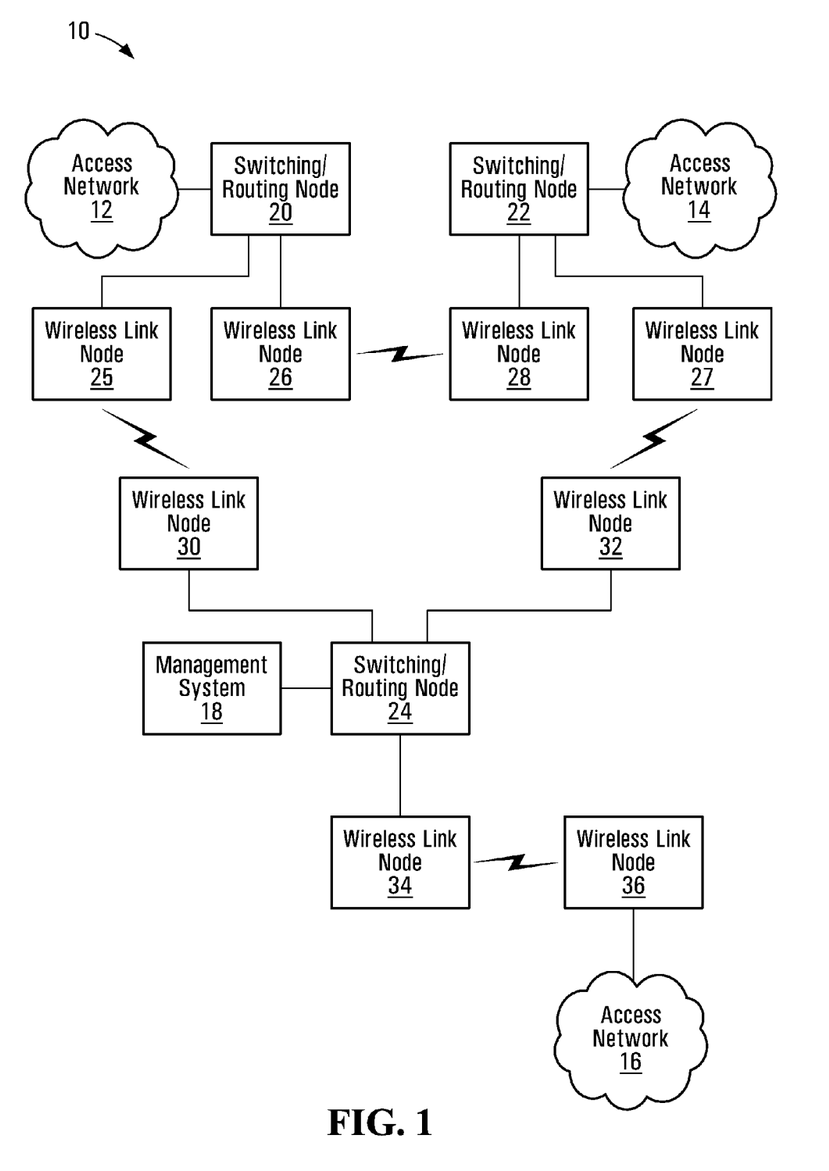
FIG. 1 is a block diagram of an example communication system.

FIG. 1 is a block diagram of a communication system 10, which includes access networks 12, 14, 16, illustratively LANs (Local Area Networks). Switching/routing nodes 20, 22, 24 that are at least coupled to or form part of the access networks 12, 14, 16 enable communications between the user networks through a core network. A management system 18, through which various functions of the switching/routing nodes 20, 22, 24 such as QoS (Quality of Service) can be configured and managed, is also shown.

For a wireless ring/mesh network implementation, the switching/routing nodes 20, 22, 24 are operatively coupled to respective wireless link nodes 25, 26, 27, 28, 30, 32. The wireless link nodes 25, 26, 27, 28, 30, 32 enable the switching/routing nodes 20, 22, 24, and thus the access networks 12, 14, 16 to communicate over wireless communication links. FIG. 1 also shows wireless link nodes 34, 36, to illustrate that wireless communication links might be used not only in the core network, but also in the access networks 12, 14, 16.

Although the access networks 12, 14, 16 may include many nodes, only one switching/routing node 20, 22, 24 per network is shown in FIG. 1 to avoid overly complicating the drawing. It will also be appreciated that a core network could interconnect many more than three switching/routing nodes.

Those skilled in the art will be familiar with various communication systems having a general structure similar to that of the system 10, the types of communication equipment such as the switching/routing nodes 20, 22, 24 provided in such systems, and the operation thereof. The system 10 might be a simple Ethernet wired mesh/ring network with the three switching/routing nodes 20, 22, 24 interconnecting the different access networks 12, 14, 16, for instance. Various types of wireless communication equipment which could be deployed as the wireless link nodes 25, 26, 27, 28, 30, 32, 34, 36 will also be known to those skilled in the art. Embodiments of the present invention relate primarily to aggregating bandwidth over multiple wireless communication links and is not specific to any particular type of communication system, network, or equipment.

In one possible implementation, the interfaces to the switching/routing nodes 20, 22, 24, at both the access side and the core network side, are Ethernet interfaces which run at 10/100/1000 Mbps. However, the bandwidth offered by each of the wireless communication links is affected by such parameters as allocated radio channel capacity and the mode of operation of wireless modems that support the wireless links. Different signal encoding mechanisms applied by a wireless modem might provide different bandwidths, for example. The wireless communication links provided by the wireless link nodes 25, 26, 27, 28, 30, 32 might therefore have more limited bandwidth capacity than the Ethernet links in this example. In one embodiment, the wireless communication links operate at 371 Mbps.

The allocated radio channel width and modem mode operation are decided by a number of factors, possibly including a regulating authority. The bandwidth offered by the wireless communication links often does not match that of the Ethernet links, and is usually less than that of the Ethernet links as indicated in the above example.

One way of addressing the issue of lower bandwidth on the wireless communication links involves using Link Aggregation control Protocol or a VLAN based spanning tree protocol. These techniques could be applied in a multiple wireless link communication system such as shown in FIG. 2.

Figure 2:
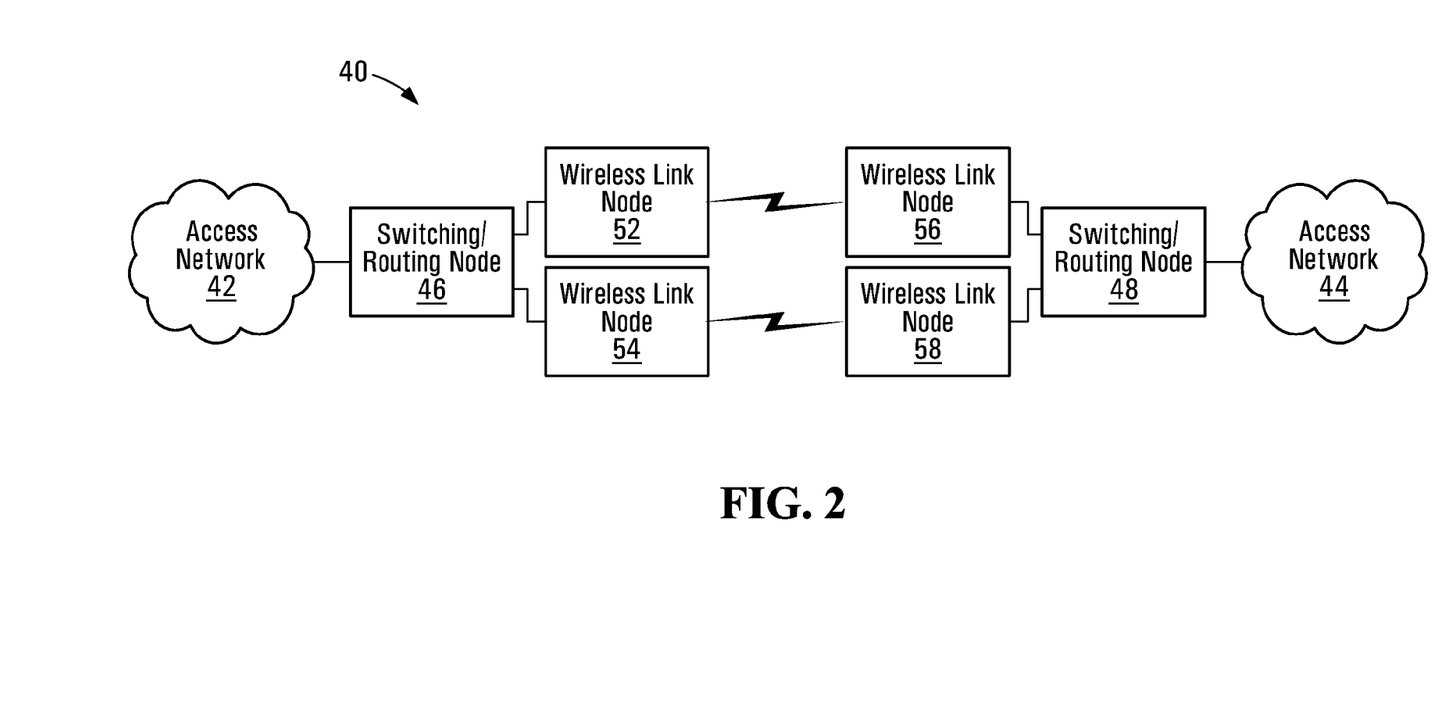
FIG. 2 is a block diagram of a multiple wireless link communication system.

The system 40 of FIG. 2 includes two access networks 42, 44, which communicate via switching/routing nodes 46, 48 and wireless communication links provided by the wireless link nodes 52/56, 54/58. In this system, the wireless bandwidth between the switching/routing nodes 46, 48 is increased by providing two wireless communication links, instead of one, between those switching/routing nodes.

The switching/routing nodes 46, 48 can run the Link Aggregation control Protocol between their respective wireless link nodes 52/54, 56/58. At the switching/routing node 46, for example, the two ports or interfaces to which the wireless link nodes 52, 54 are connected are grouped together and traffic is distributed amongst them according to standard distribution algorithms. The same grouping and distribution algorithms are applied by the switching/routing node 48 to the two ports or interfaces to which the wireless link nodes 56, 58 are connected. Another way of handling the multiple wireless communication links in the system 40 is to configure the two switching/routing nodes 46, 48 to distribute traffic based on VLAN ids using a Spanning Tree Protocol.

In both of these cases true bandwidth distribution cannot be achieved, since these schemes distribute the traffic based on traffic stream characteristics. Although two different traffic streams or flows might be distributed to the two wireless links by the switching/routing nodes 46, 48, a traffic stream or flow that is directed to a particular destination from a particular source, for example, would not be "split" between the two wireless communication links. There is no way to guarantee that the traffic streams or flows in a network are balanced in terms of their bandwidth requirements.

Another possible issue that may arise with evenly splitting a traffic flow is variable frame or packet sizes that are used in many communication protocols. Ethernet frames, for example, are of variable-length, and therefore received Ethernet frames cannot be evenly distributed between multiple wireless communication links unless the received frames have the same length, which cannot be guaranteed.

Embodiments of the invention provide a new scheme for aggregating bandwidth. Multiple wireless links are interconnected for aggregating wireless bandwidth. Incoming communication traffic is processed and distributed among the interconnected wireless links. Proportional bandwidth sharing and hence increased bandwidth utilization can be achieved immaterial of the incoming traffic profile. The proposed schemes may enable wide scale deployment of wireless communication links in Ethernet networks, for example, while alleviating concerns regarding bandwidth under-utilization.

The presently disclosed mechanisms help in aggregating the bandwidth of multiple wireless links. A primary node or apparatus interfaces with a network, illustratively a user network, processes user traffic, and creates multiple streams of radio blocks, for both primary and secondary wireless communication links. The primary node sends radio blocks to and receives radio blocks from the secondary node(s), and recreates user traffic streams. The primary node distributes user data among the multiple links independent of the actual content of received traffic, thus achieving proportional load balancing.

Figure 3:
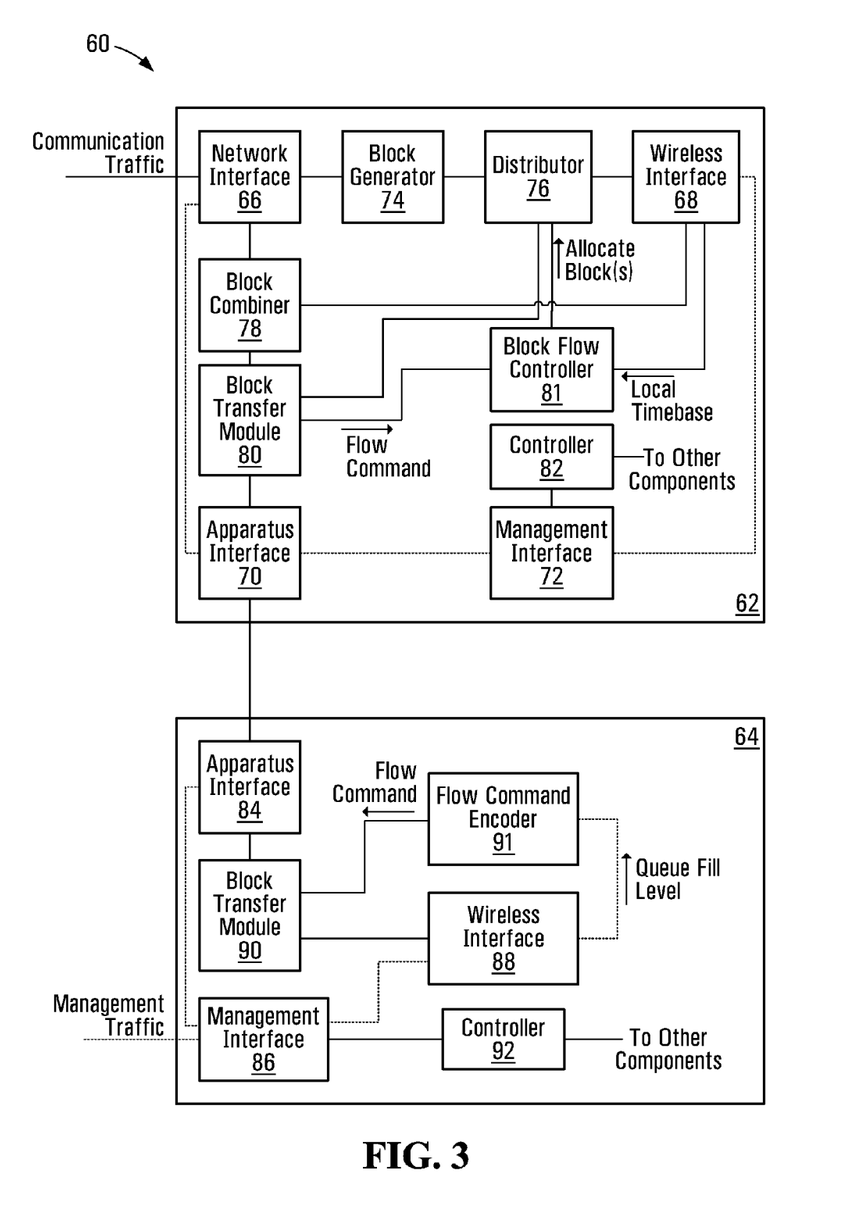
FIG. 3 is a block diagram of an example multiple wireless link communication system according to an embodiment of the present invention.

FIG. 3 is a block diagram of a multiple wireless link communication system according to an embodiment of the present invention. The system 60 includes two communication apparatus 62, 64. The apparatus 62 includes a network interface 66, a wireless interface 68, an apparatus interface 70, and a management interface 72. A block generator 74, a distributor 76, a block combiner 78, a block transfer module 80, a block flow controller 81, and a controller 82 are operatively coupled to the interfaces 66, 68, 70, 72 and to each other as shown. The apparatus 64 includes an apparatus interface 84, a management interface 86, a wireless interface 88, a block transfer module 90 operatively coupled to the apparatus interface and to the wireless interface, a flow command encoder 91 operatively coupled to the wireless interface and to the block transfer module, and a controller 92 operatively coupled to the management interface and possibly to other apparatus components. The dashed lines in FIG. 3 illustrate optional connections, which might be provided in one particular implementation of a management scheme as described in further detail below.

Communication equipment in which the example apparatus 62, 64 are implemented, such as different wireless link nodes, may include additional components that have not been explicitly shown in FIG. 3 in order to avoid overly complicating the drawing. More generally, other embodiments may include further, fewer, or different components which may be interconnected in a similar or different manner than shown.

The network interface 66 includes components which support communications over a network communication link, illustratively a link to an Ethernet switching/routing node. Such components often include hardware at least in the form of a physical port or connector. Traffic processing such as QoS processing and/or rate limiting, for example, may also be performed by the network interface 66. The network interface 66 is intended to represent a module that handles communication traffic that is received by the apparatus 62. Thus, the network interface 66 may include other components, illustratively at least a transceiver and a packet processor for instance, in addition to a physical port or connector.

Hardware, firmware, components which execute software, or some combination thereof might be used in implementing the network interface 66, and possibly other elements of the apparatus 62, 64. Electronic devices that may be suitable for this purpose include, among others, microprocessors, network processors, microcontrollers, PLDs (Programmable Logic Devices), FPGAs (Field Programmable Gate Arrays), ASICs (Application Specific Integrated Circuits), and other types of "intelligent" integrated circuits.

The exact structure of the network interface 66 may, to at least some extent, be implementation-dependent, and could vary depending on the type of connection(s) and/or protocol(s) to be supported. In one embodiment, the network interface 66 supports Ethernet communications, in which case the network interface processes received Ethernet frames to extract content for transmission via the wireless links that are provided by the wireless interfaces 68, 88.

The wireless interfaces 68, 88, the apparatus interfaces 70, 84, and the management interfaces 72, 86, like the network interface 66, include components such as physical ports or connectors and possibly other components which support communications over respective communication links. In the case of the wireless interfaces 68, 88, these components may include at least a wireless modem, a radio, and/or other components that are used in communicating over wireless communication links. In one embodiment, the apparatus interfaces 70, 84 are spare Ethernet interfaces that are provided in wireless link nodes. The management interfaces 86 are also Ethernet interfaces for connection to a switching/routing node in one embodiment. As noted above for the network interface 66, the structures of the wireless interfaces 68, 88, the apparatus interfaces 70, 84, and the management interfaces 72, 86 may be dependent upon the type of connection(s) and/or protocol(s) that are to be supported.

In many implementations, these interfaces will be identical in the apparatus 62, 64. However, embodiments of the invention are not in any way limited to such implementations. The mechanisms disclosed herein could potentially be used in conjunction with wireless interfaces 68, 88 that support wireless communication links having different bandwidths, for instance. In one particular embodiment described in detail below, each apparatus 62, 64 includes two Ethernet interfaces in addition to a wireless interface 68, 88. In the apparatus 62, one of the Ethernet interfaces is used as the network interface 66, the other is used as the apparatus interface 70, and the management interface 72 is a "virtual" interface as opposed to a separate physical interface. In the apparatus 64, one of the Ethernet interfaces is used as the apparatus interface 84 and the other is used as the management interface 86 to enable management traffic to be exchanged with a switching/routing node.

The block generator 74, the distributor 76, the block combiner 78, the block transfer modules 80, 90, the block flow controller 81, the flow command encoder 91, and the controllers 82, 92 may be implemented using hardware, firmware, and/or components which execute software. These modules are defined moreso by their functions rather than a particular internal structure. The present disclosure would enable a skilled person to implement these modules in any of various ways to perform their respective functions. The block flow controller 81 and the controller 82 have been shown separately in FIG. 3 to represent components which perform different control functions. In one embodiment, the block flow controller 81 is involved in controlling the flow of radio blocks between primary and secondary apparatus, as described in further detail below, whereas the controller 82 performs more general control functions for managing each apparatus.

In operation, the apparatus 62 and the apparatus 64 are interconnected to each other through the apparatus interfaces 70, 84, and together provide two wireless links. A similar installation of interconnected apparatus would be provided at the other end of the wireless communication links. This type of installation could be used to increase the overall capacity on any of the wireless links shown in FIG. 1, for example. Additional wireless link nodes could be connected to the wireless link nodes 25, 30 to increase wireless bandwidth between the switching/routing nodes 20, 24. The wireless bandwidth between other components of the system 10 could be increased in a similar manner.

As described in further detail herein, communication traffic received by the network interface 66 is processed and converted into a radio block stream. The radio blocks are then distributed between the two wireless communication links. The radio blocks to that are distributed to the wireless communication link that is associated with the apparatus 64 and specifically the wireless interface 88 are delivered over the inter-apparatus communication link, illustratively an Ethernet connection, through the apparatus interfaces 70, 84.

In one embodiment, each wireless communication link, while working on its own, has fixed wireless bandwidth. When configured to work in the bandwidth aggregation mode, one of the wireless communication links might be a primary link, with the other being a secondary link. In the system 60, the wireless communication link associated with the apparatus 62 is the primary link, and the wireless communication link associated with the apparatus 64 is the secondary link. The apparatus 64 does not directly process received communication traffic, but rather acts as a wireless conduit. The primary apparatus 62 connects to a switching/routing node, for example, through the network interface 66. Received communication traffic might be Ethernet frames carrying user Ethernet data, for instance. The apparatus 62, and in particular its network interface 66, may classify and prioritize the data if QoS is enabled, and other processing may also be performed.

The received traffic is then converted into appropriate radio blocks for transmission on a wireless communication link and distributed over the local and secondary wireless communication links. The radio blocks to be sent to the secondary wireless communication link are encapsulated in Ethernet headers in one embodiment for transfer over an Ethernet connection between the apparatus interfaces 70, 84. In the case of an Ethernet connection between the primary apparatus 62 and the secondary apparatus 64, the Ethernet headers that were used to transport the radio blocks are removed and the radio blocks are sent over the wireless interface 88.

At the other end of the wireless communication links, the radio blocks are combined to reproduce the originally received communication traffic.

In the other direction, radio blocks that are received through the wireless interface 88 in the secondary apparatus 64 are encapsulated in Ethernet headers and sent to the primary apparatus 60, where the Ethernet headers are removed. The resulting radio blocks are combined with radio blocks arriving through the wireless interface 68 to deliver communication traffic to the network interface 66 for transmission from the primary apparatus 62.

It can be noted from this example that the bandwidths of two wireless communication links can be combined to service the traffic from one port or connection from a switching/routing node to which the network interface of the apparatus 62 is connected. This mechanism gives the flexibility to process communication traffic in the apparatus 62 in such a way that the traffic can be subjected to the same QoS mechanism and/or other traffic processing, and one stream of radio blocks is produced. These radio blocks are then distributed among the two wireless communication links independent of the characteristics of the traffic that was used to generate those blocks.

Considering the example system 60 and its operation in more detail, the block generator 74 receives communication traffic that has been processed by the network interface 66 and generates fixed-length communication traffic blocks for transmission over a wireless communication link. The generated communication traffic blocks, described above as radio blocks, might include user data from the received communication traffic. The distributor 76 distributes the communication traffic blocks between a first wireless communication link associated with the apparatus 62 and a second wireless communication link associated with the apparatus 64 for transmission over the first and second wireless communication links. The block transfer module 80 enables the communication traffic blocks that are distributed to the second wireless communication link to be transferred to the apparatus 64 over the inter-apparatus communication link, through the apparatus interface 70 in the example shown.

In some embodiments, the communication link over which the communication traffic is received and the inter-apparatus communication link are of the same type, although different types of links are also contemplated.

Where the inter-apparatus communication link is an Ethernet link, the block transfer module 80 might encapsulate the communication traffic blocks that are distributed to the second wireless communication link into Ethernet frames.

As noted above, some traffic distribution mechanisms do not distribute the same traffic flow to different wireless links. In the example system 60, however, the distributor 76 may distribute the communication traffic blocks that are generated by the block generator 74 between the first wireless communication link and the second wireless communication link independently of source information and destination information in the received communication traffic. The distribution may also be independent of other header or overhead information in the received communication traffic, to provide for true bandwidth sharing or load balancing of transmission of the received traffic over the first and second wireless communication links.

Communication traffic that is received by through the network interface 66 is thus separated into a sequence of radio blocks by the block generator 74. Preserving the original order of received communication traffic in the sequence of radio blocks simplifies the process of rebuilding the radio blocks at a receiving end of the wireless communication links, since the original communication traffic can then be rebuilt by combining the contents of the radio blocks in their sequential order, as described in further detail below.

Although embodiments of the present invention may involve distribution of communication traffic independently of traffic profiles or overhead information, any of various parameters may be taken into account in determining the exact distribution that is to be applied. For example, the distributor 76 might determine an operational status of each of the first and second wireless communication links, and determine a distribution of communication traffic blocks based on the determined operational status. Where one of the wireless communication links fails or an error rate observed on one of those links is higher than a threshold, for instance, the distributor 76 could route communication traffic blocks only to the other link. This provides a level of redundancy protection. The distributor 76 could also or instead determine data rates on the wireless communication links and set a distribution ratio accordingly. A block flow control mechanism may also or instead be provided between a primary apparatus and any secondary apparatus, and an example of such a mechanism using the block flow controller 81 and the flow command encoder 91 is described in detail below.

Parameters that affect the distribution of communication traffic blocks need not necessarily be monitored by the distributor 76 directly. The controller 82 or some other component(s) of the apparatus 62 or a network node in which or in conjunction with which the apparatus is implemented might monitor and report any such parameters, or provide commands to vary the distribution mechanism on the basis of the parameters, to the distributor 76. Explicit management of the distribution mechanism by a network operator or other personnel, through the management interface 72 and the controller 82 for instance, is also possible.

In order to assist a receiving apparatus at the other end of the wireless communication links in regenerating the original received communication traffic stream from the traffic blocks it receives over the wireless links, the block generator 74 might include a unique identifier in each of the communication traffic blocks. Such an identifier could be a sequence number, for example, which indicates an order of a block relative to other blocks that were generated from the same traffic stream, for example. As noted above, preserving the order of a received communication traffic stream in the blocks that are generated by the block generator 74 allows a receiving apparatus to regenerate the traffic stream by combining received blocks in their sequential order, without looking into other content of those blocks to determine how the blocks are to be combined. In one embodiment, sequence numbers that are added to the blocks by the block generator 74, and are used at the receiving end to properly sequence the blocks for combining.

The system 60 may also receive communication traffic over the first and second wireless communication links. To this end, the block transfer module 80 also enables communication traffic blocks received by the apparatus 64 through the wireless interface 88 to be transferred to the apparatus 62. The block combiner 78 combines communication traffic blocks that are received from the apparatus 64 with communication traffic blocks that are received over the first wireless communication link through the wireless interface 68, in the order indicated by their sequence numbers for instance. This combining results in a combined communication traffic stream that regenerates a communication traffic stream that was received at the other end of the wireless communication links and transmitted to the system 60 over those links. The combined communication traffic stream would then be provided to the network interface 66 for transmission.

FIG. 3 shows the primary apparatus 62 and the secondary apparatus 64 as having different implementations, with the secondary apparatus having only a subset of the components of the primary apparatus. In some embodiments, however, the primary and secondary apparatus are identical in structure, and are configurable for operation in either of a primary operating mode and a secondary operating mode. When configured in the primary operating mode, the block generator of an apparatus receives communication traffic and generates fixed-length communication traffic blocks, and the distributor distributes the generated communication traffic blocks. The block transfer module of an apparatus that is configured to operate in the secondary operating mode receives communication traffic blocks that are distributed to the wireless communication link of the apparatus by the distributor of another apparatus. The block generator, the distributor, and the block combiner, as well as the block flow controller described below, in an apparatus that is operating in secondary mode might simply be inactive.

Normally only one apparatus of an interconnected group would be configured for operation in the primary operating mode and the other would be configured for operation in the secondary operating mode. These configurations could potentially be adjustable, illustratively to reverse the primary/secondary designations. This type of functionality could be supported where the apparatus 64 also has a network interface 66, a block generator 74, a distributor 76, and a block combiner 78.

Adjustments to primary/secondary configurations could be operator-driven, through the management interfaces 72, 86. In one possible implementation, the apparatus 62, 64 are connected to the same switching/routing node through their management interfaces 72, 86, to enable management information such as control or configuration information to be exchanged with a remote management or control system such as the management system 18 shown in FIG. 1.

Automatic switching of primary/secondary configurations is also possible. Where the apparatus 64 has a network interface and a separate communication link to the same network as the apparatus 62, then the apparatus 64 could be reconfigured as the primary apparatus, to exchange communication traffic through the interface that is being used as the management interface 86 in one embodiment, if the network communication link of the apparatus 62 fails. Failure of a network communication link could be detected, and a configuration switch could also be initiated, by one or more of the primary apparatus, the network, or possibly the secondary apparatus. One or both of the management interfaces 72, 86 could be used to coordinate a primary/secondary reconfiguration.

A secondary apparatus could also or instead be reconfigured as a primary apparatus under other conditions as well. For example, a fault or failure affecting the primary apparatus, and not just its network communication link, could lead to a secondary apparatus being reconfigured as the primary apparatus. Other conditions that might automatically initiate or otherwise lead to a primary/secondary reconfiguration may be or become apparent to those skilled in the art.

Management traffic could potentially be exchanged over the same links as communication traffic in some embodiments. For example, the apparatus interfaces 70, 84 could also enable exchange of management traffic between the apparatus 62, 64 for managing the first and second wireless communication links and/or other features or components of the apparatus. Tags or other identifiers could be applied to management traffic packets or information by the block generator 74 or the block transfer modules 80, 90, for example, to differentiate communication traffic blocks from management traffic. Received management traffic can then be provided to the controllers 82, 92. The management interfaces 72, 86 could be provided even where management traffic is exchanged between interconnected apparatus 62, 64. Inter-apparatus exchange of management traffic through the apparatus interfaces 70, 84 might be used by the primary and secondary apparatus to coordinate their operation with each other, for example, whereas the management interfaces 72, 86 would permit other management functions to be performed remotely.

The dashed lines in FIG. 3 illustrate another possible management scheme. In one embodiment, each apparatus 62, 64 includes two Ethernet interfaces in addition to its wireless interface 68, 88. These Ethernet interfaces in the apparatus 62 are respectively used as the network interface 66 and the apparatus interface 70, and the management interface 72 is effectively a virtual interface rather than a separate external interface. The two Ethernet interfaces in the apparatus 64 are respectively used as the apparatus interface 84 and the management interface 86, which is operatively coupled to the same switching/routing node as the network interface 66 but handles management traffic.

With this type of implementation, the secondary apparatus 64, the primary apparatus 62, and the counterpart or peer primary and secondary apparatus at the other end of the wireless communication links can all be managed through the management interface 86. Management traffic is received by the management interface 86 and provided to the local controller 92 if that management traffic is to be consumed by the local controller, or to the apparatus interface 84 in the example shown if the received management traffic is for another controller. In some cases, management traffic could potentially be applied to all managed controllers, and thus could be provided to both the local controller 92 and the apparatus interface 84.

Management traffic that is to be transferred to another controller is sent to the apparatus 62 through the apparatus interfaces 84, 70. In the above example of Ethernet interfaces as the interfaces 66, 70, 84, 86, the received management traffic is Ethernet traffic and thus the management traffic might not need further processing for transfer between the apparatus 64, 62. The management traffic received at the apparatus interface 70 is provided to the controller 82 through the management interface 72 and/or to the network interface 66. This enables the controller 82 to also be managed through the management interface 86 of the secondary apparatus 64 and a virtual management interface 72, rather than two separate physical management interfaces.

Any management traffic that is received by the network interface 66 can be processed in the same manner as communication traffic, for transfer to the other end of the wireless communication links. Radio blocks including the management traffic are generated by the block generator 74, which could include tags or other information in the generated blocks to allow those blocks to be identified as blocks that include management traffic. The generated blocks are distributed by the distributor 76, and transmitted over the wireless communication links.

At the receiving end of the wireless links, the radio blocks that include the management traffic are received through the wireless interfaces 68, 88 and provided to the primary and/or secondary controllers 82, 92. Although direct dashed connections between the wireless interfaces 68, 88 and the management interfaces 72, 86 are shown in FIG. 3, these dashed connections are intended to represent a logical flow of management traffic rather than direct physical flow. In one embodiment, radio blocks that are received through the wireless interfaces 68, 88 and include management traffic are actually provided to the block combiner to regenerate the management traffic. The regenerated management traffic can then be provided to the controller 82 through the apparatus interface 70 and the management interface 72, and/or to the controller 92 through the apparatus interfaces 70, 84 and the management interface 86. Management traffic could potentially be transmitted externally from the secondary apparatus 64 through the management interface 86.

In this example, the management interface 86 and the apparatus interfaces 70, 84 implement such functions as distinguishing between radio blocks and management traffic that is received at the management interface 86, and providing the received management traffic to a local controller and/or to another interface. Where the management interface 86, the apparatus interfaces 84, 70, and the network interface 66 are all Ethernet interfaces, or more generally the same type of interface, received management traffic can be transferred between those interfaces without further processing. In other embodiments, format conversions and/or other management traffic processing functions could be performed by the block transfer modules 80, 90 or other components. Providing received management traffic to the network interface 66 as described above allows the received management traffic to be transmitted to the apparatus at the other end of the wireless communication links as well.

This type of mechanism may be used to manage primary and secondary apparatus at both ends of the wireless communication links through a single external management interface, which is the management interface 86 in the above example. In some embodiments, an external management interface is available in the secondary apparatus at each end of the wireless communication links, and one or both of the external management interfaces may be used in managing primary and secondary apparatus.

An example synchronization or block flow control mechanism is shown separately from the more generic control mechanism represented by the controllers 82, 92 in FIG. 3. The primary wireless communication link and the secondary wireless communication link in the example system 60, or each secondary link where multiple secondary links are provided, may carry data in a periodic manner and at a predetermined nominal rate. However, the wireless links may operate asynchronously to each other, such that the actual instantaneous rates are close, but not necessarily identical. There may be some relative drift between the wireless links, arising from tolerance and stability characteristics unique to each apparatus, for example.

Due to the periodic nature of the wireless communication links in some embodiments, each link can be thought of as presenting a series of transmission opportunities, or "slots". In order to make the best use of over-air bandwidth, it may be desirable to have the distributor 76 allocate radio blocks to all of these slots. If radio blocks are to be allocated to the wireless communication links on a dynamic basis, then the distributor 76 continually adapts in order to meet the "needs", i.e., fully utilize the available bandwidth, of each link. To achieve this, real-time information about the availability of upcoming transmission slots on each secondary wireless communication link is provided to the distributor 76 through the inter-apparatus connection between the apparatus interfaces 70, 84.

Other traffic that shares the interconnecting medium, such as management traffic as described above, may make it difficult to communicate events in a predictable and timely manner. Instead of attempting to signal the primary apparatus to transfer each individual radio block for a secondary wireless communication link, which could potentially be done in some embodiments, according to the example shown in FIG. 3 a queue of radio blocks waiting to be transmitted is established for each link, illustratively in the wireless interfaces 68, 88. The length of the transmit queue for each wireless communication link is monitored, and a block flow control mechanism attempts to keep the length of each queue between upper and lower thresholds. Since the distributor 76 is co-located with the primary wireless communication link, it has direct visibility into the queue of radio blocks awaiting transmission over that link. However, there is no such direct visibility into the queue(s) for the secondary link(s).

In one embodiment, management of adaptive distribution of radio blocks in this environment takes advantage of the fact that the rates are similar among links. The distributor 76 can then effectively assume that the or each secondary wireless communication link requires radio blocks at the same rate as the primary wireless communication link, and distributes the radio blocks accordingly. At a secondary apparatus, the requirement for more or fewer radio blocks for its secondary link is determined from the queue of transmit radio blocks. For example, if the queue is longer than a predetermined threshold, then it could be judged that fewer blocks per second or other time frame are required, and if the queue length is shorter than a second threshold, then it could be judged that more radio blocks are required. The queue length relative to the thresholds is encoded into flow control or management commands by the flow command encoder 91 and transferred to the primary apparatus 62. In the system 60, flow commands are transferred to the primary apparatus 62 through the block transfer module 90, which encapsulates the flow commands into Ethernet frames in one embodiment. Depending on the format of the flow commands and the inter-apparatus communication link, this transfer could involve further or different processing, or possibly no additional processing by the block transfer module or other components prior to transfer through the apparatus interface 84. Thus, the flow command encoder 91 could be operatively coupled to the apparatus interface 84 instead of to the block transfer module 90.

In one embodiment, the monitored queue length is encoded by the flow command encoder into one of 3 flow management commands: NOP, SEND_MORE and SEND_LESS. These commands are transferred to the primary apparatus over the shared inter-apparatus link to the block flow controller 81. As noted above for the flow command encoder 91, the block flow controller 81 need not necessarily receive flow commands through the block transfer module 80 as shown in the example system 60.

The block flow controller 81 may implement a flow control engine or process for each secondary wireless communication link. In one embodiment, each flow control engine can exhibit one of 8 states, simply designated with integer numbers: $\{3, 2, 1, 0, -1, -2, -3, -4\}$. When the engine state is non-negative, i.e., one of $\{3, 2, 1, 0\}$, the block flow controller 81 provides a command the distributor 76 to allocate a radio block to the associated secondary wireless communication link at the next opportunity. These commands may be the same as the flow commands received from the secondary apparatus 64 or of a different form. The distributor 76 serves such commands for each secondary wireless communication link in a round-robin fashion in some embodiments.

In this example, the states of all flow control engines could start out at 0, and be decremented each time a radio block is allocated to the associated secondary wireless communication link. Initially on startup then, each secondary wireless communication link is allocated 1 radio block, and the state of its associated flow control engine subsequently becomes $-1$. The states of all flow control engines for the secondary wireless communication links could also be incremented whenever the primary wireless communication link is allocated a radio block. Thus, in the absence of any other mechanism in this example, when the primary wireless communication link is allocated a radio block, the states for all flow control engines become 0 and all secondary wireless communication links are allocated a radio block, after which their flow control engine states return to $-1$.

When the block flow controller 81 receives a flow command for a secondary wireless communication link, the state of the flow control engine for that link is adjusted accordingly. On receiving a SEND_MORE command, the flow control engine increments its state, and on receiving a SEND_LESS command, it decrements its state. In this manner, a SEND_MORE command will allow the distributor 76 to send an extra radio block to a secondary wireless communication link relative to the number of radio blocks it sends to the primary wireless communication link, and a SEND_LESS command can prevent the distributor from sending a radio block to a link that it would have otherwise sent, relative to the primary link. A NOP command has no effect on the radio block distribution and serves only as a placeholder in the flow control command path in one embodiment.

As noted above, 8 flow control engine states are supported in one embodiment. Although only states 0 and $-1$ have been explicitly described above, the extra states allow for a flow control engine state to be incremented or decremented multiple times within a block allocation cycle. For example, if the block flow controller 81 receives a SEND_LESS command for a secondary wireless communication link just as a block is allocated to that secondary link, then the state of the flow control engine for the secondary link is decremented twice. Similarly, if the block flow controller 81 receives a SEND_MORE command for a secondary wireless communication link just as a block is allocated on the primary wireless communication link, then the state of the flow control engine is incremented twice. Subsequent flow commands may similarly cause flow control engines to transition into higher or lower states.

Embodiments of the invention are not in any way restricted to a particular number of states, or even to this type of block flow control mechanism. The process for each flow control engine eventually saturates at the 3 state or the −4 state in the above example, which may provide adequate block flow control in some applications. Providing a different number of states would enable different saturation and flow control characteristics. Another embodiment uses two-bit states, for example, which supports states of {1, 0, −1, −2} and saturates at either the 1 or −2 level.

The command and radio block allocation or distribution scheme runs continuously, and manages the flow of radio blocks such that all wireless communication links are fully utilized, and no radio blocks are sent to wireless communication links that are not ready to process them.

It should be appreciated that other block flow control and allocation or distribution mechanisms are also possible. For instance, although the above example refers to incrementing flow control engine states for secondary wireless communication links each time a radio block is distributed to the primary wireless communication link, thereby effectively using the primary link and its local timebase to pace block distribution to the secondary links, other embodiments could potentially use a different timing source and/or mechanism to control block flow.

Another possible variation of the system 60 and the operations described above would be to provide multiple secondary apparatus installations and thus multiple secondary wireless communication links. The distributor 76 could then distribute communication traffic blocks between its local wireless communication link and any or all of the multiple secondary wireless communication links. In this case, the block transfer module 80 would enable the communication traffic blocks that are distributed to the secondary wireless communication links to be transferred over a respective further communication link to the secondary apparatus with which each of the secondary wireless communication links is associated.

Figure 4:
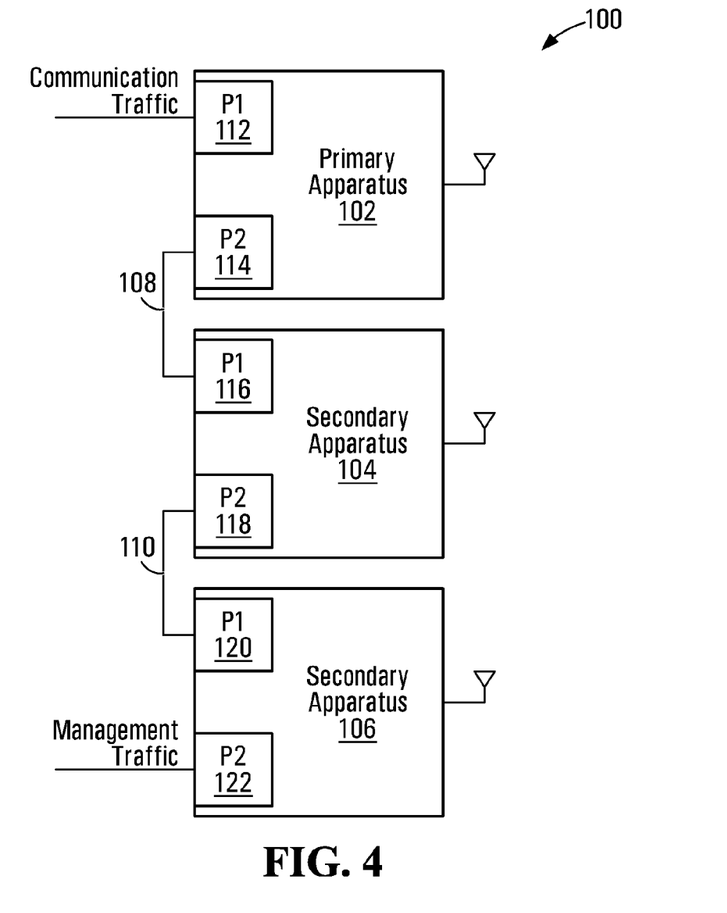
FIG. 4 is a block diagram of an example multiple wireless link communication system having more than two wireless links.

The example described above refers to respective communication links between a primary apparatus and more than one secondary apparatus. Other implementations are also contemplated. FIG. 4 is a block diagram of another example multiple wireless link communication system having more than two wireless links. In the example system 100, a primary apparatus 102 and two secondary apparatus 104, 106 each have two external interfaces, in the form of ports 112/114, 116/118, 120/122, and these ports are connected together in a Daisy chain configuration. One port 112 of the primary apparatus 102 is connected to receive and transmit communication traffic, and its other port 114 is connected to one of the ports 116 of the secondary apparatus 104 through a connection 108. The other port 118 of the secondary apparatus 104 is connected to one of the ports 120 of the secondary apparatus 106 through a connection 110. The other port 122 of the secondary apparatus 106 is connected to at least receive, and possibly transmit, management traffic.

The apparatus 102, 104, 106 may be identical in structure, as described above with reference to FIG. 3 and the example system 60, although their configurations and the uses of their respective ports may be different. The primary apparatus 102 and the "last" secondary apparatus 106 are analogous to the apparatus 62 and the apparatus 64 (FIG. 3), respectively. In the intermediate secondary apparatus 104, the two ports 116, 118 are both used as apparatus interfaces for transfer of communication traffic, and management traffic in some embodiments, to and from the primary apparatus 102 and the secondary apparatus 106.

The example system 100 provides three wireless communication links to which communication traffic can be distributed. In this case, radio blocks that are generated by the primary apparatus 102 are transferred to the secondary apparatus 104 through the same communication link 108. Radio blocks that are to be transmitted over the wireless communication link associated with the secondary apparatus 106 are in turn transferred to the secondary apparatus 106, illustratively by the block transfer module of the secondary apparatus 104. The block transfer module of the secondary apparatus 104 might determine that a radio block that it receives from the primary apparatus 102 is to be transferred onward to the secondary apparatus 106 in accordance with any of various distribution schemes. For example, the block generator in the primary apparatus 102 could include in each distributed radio block an identifier of the secondary apparatus which is to transmit the radio block over its wireless communication link. Another option would be for a block transfer module in the primary apparatus 102 to include different destination addresses in Ethernet frames, for example, that include transferred radio blocks. This would enable the secondary apparatus 104 to determine whether the transferred radio blocks are for its own processing or for further transfer to the secondary apparatus 106. A fixed distribution scheme might also or instead be used. In the example system 100, there are two secondary apparatus 104, 106, and thus the intermediate secondary apparatus 104 could transfer every second received radio block to the secondary apparatus 106.

FIG. 3 shows an example of a two wireless link system, and FIG. 4 shows an example of a three wireless link system. Higher numbers of wireless links could also be provided by adding further intermediate secondary apparatus 104 between the primary apparatus 102 and an end secondary apparatus 106 in a Daisy chain configuration, or multiple inter-apparatus links in a star configuration, for example.

Thus, embodiments of the invention are not limited to arrangements that provide only a pair of wireless communication links.

Figure 5:
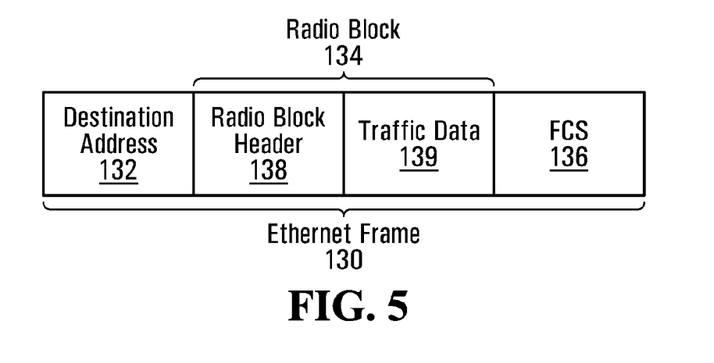
FIG. 5 is a block diagram of an example block transfer format.

As noted above, radio blocks are encapsulated into Ethernet frames for inter-apparatus transfer in one embodiment. FIG. 5 is a block diagram of an example block transfer format. The example shown in FIG. 5 is an Ethernet frame 130, which includes a destination address 132 to identify the secondary apparatus that is to process a transferred radio block, a radio block 134, and an FCS (Frame Check Sequence) 136. The destination address 132 could be part of an Ethernet header that is added to the radio block 134 by a block transfer module of a primary apparatus. The FCS 136 could similarly be added to the radio block 134 in an encapsulation process.

The radio block 134 includes a radio block header 138 and traffic data 139. The radio block header could include such information as the unique identifier and/or sequence number described above. Information to allow delineation of frame boundaries in originally received communication traffic from which the radio block was generated could also be included in the radio block header 138. The traffic data 139 includes actual content from the received communication traffic.

Other formats than those shown in FIG. 5 may be used for radio blocks and/or to transfer those blocks between primary and secondary apparatus. The example provided in FIG. 5 is intended solely for the purposes of illustration.

Figure 6:
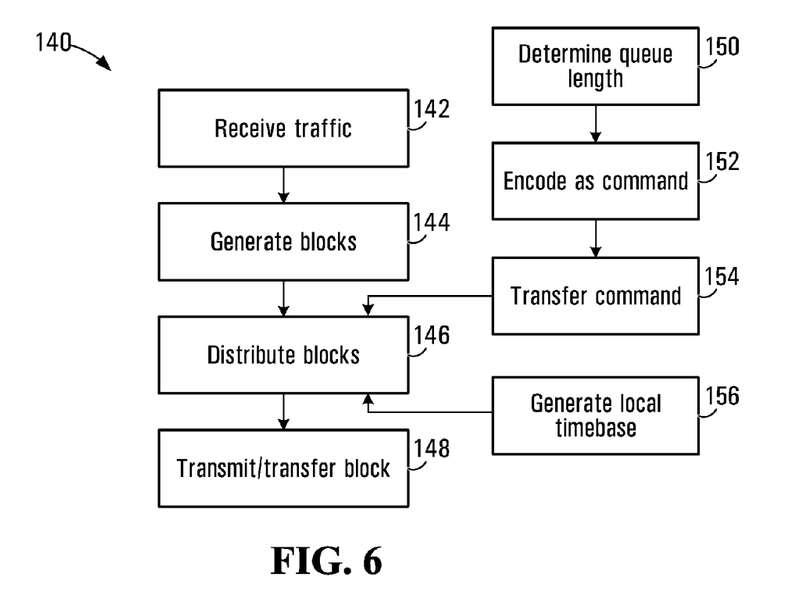
FIGS. 6 to 8 are flow diagrams illustrating methods of embodiments of the invention.
Figure 7:
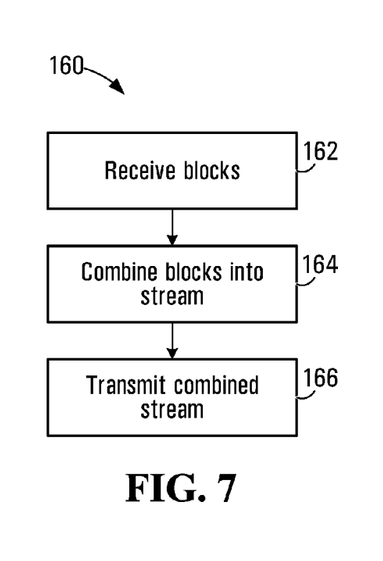
Figure 8:
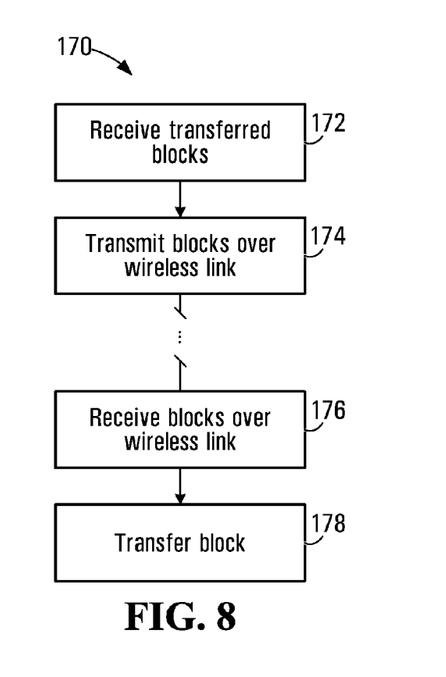

Aspects of the invention may also or instead be embodied in methods. FIGS. 6 to 8 are flow diagrams illustrating examples of such methods.

With reference to FIG. 6, the method 140 involves receiving communication traffic at a first communication apparatus, at 142. Fixed-length communication traffic blocks are generated from the received communication traffic at 144 for transmission over a wireless communication link. At 146, the generated communication traffic blocks are distributed between a first wireless communication link associated with the first communication apparatus and a second wireless communication link associated with a second communication apparatus for transmission of the communication traffic blocks over the first and second wireless communication links. The communication traffic blocks that are distributed to the first wireless communication link are transmitted over the first wireless communication link, and the communication traffic blocks that are distributed to the second wireless communication link are transferred to the second communication apparatus over a further communication link, as shown at 148.

FIG. 6 also shows operations that might be involved in controlling radio block flow. A transmit queue length for a secondary wireless communication link is determined at 150, encoded into a flow command at 152, and transferred to the primary apparatus at 154 for use in distributing radio blocks at 146. The operations at 150, 152, 154 may be performed for each secondary wireless communication link where multiple secondary links are provided. A local timebase is generated by the primary apparatus at 156 and is also used in block distribution at 146 in the example shown.

The method 160 of FIG. 7 illustrates operations that are performed at a receiving end of aggregated wireless communication links in one embodiment. Communication traffic blocks are received at 162. This includes not only receiving communication traffic blocks over a first wireless communication link associated with a first communication apparatus, but also receiving at the first communication apparatus, from a second communication apparatus over a further communication link, communication traffic blocks that are received by the second communication apparatus over a second wireless communication link associated with the second communication apparatus. At 164, communication traffic blocks that are received from the second communication apparatus are combined with communication traffic blocks that are received over the first wireless communication link, in their correct sequential order. A resultant combined communication traffic stream is transmitted at 166.

FIG. 8 illustrates an example of a method 170 that might be performed at a secondary apparatus. In general, communication traffic blocks are communicated over a first wireless communication link associated with a first communication apparatus, and those blocks are also transferred between the first communication apparatus and a second communication apparatus over a further communication link. The communication traffic blocks and further communication traffic blocks that are communicated over a second wireless communication link associated with the second communication apparatus together comprise communication traffic of the same communication traffic stream. Communicating the communication traffic blocks may involve transmitting from one apparatus communication traffic blocks that are transferred from another apparatus, as shown at 172, 174, or transferring to another apparatus communication traffic blocks that are received at one apparatus over a local wireless communication link, as shown at 176, 178. The communicating and transferring operations may thus be performed in different orders, depending on whether communication traffic blocks are received or are to be transmitted over the wireless communication link.

The methods 140, 160, 170 are illustrative of embodiments of the invention. Other embodiments may involve further, fewer, and/or different operations, performed in a similar or different order. Additional variations may also be or become apparent to those skilled in the art. For example, various options for performing some of the operations shown in FIGS. 6 to 8, as well as other variations, will be apparent from the foregoing description of FIGS. 3 to 5.

In accordance with embodiments of the invention, multiple wireless links may be interconnected to deliver higher aggregate bandwidth while feeding traffic to and from a network through a primary link. The interconnection may be through Ethernet or other media. Communication traffic is processed, and radio blocks can be generated independent of the source or destination and other information that appears in the header or overhead of such traffic in order to allow separate traffic streams to be differentiated. The generated radio blocks, which are uniquely identified in some embodiments, are distributed between primary and secondary apparatus for transmission over primary and secondary wireless communication links. The interconnection between the primary and secondary apparatus is used by the primary apparatus to send radio blocks to and receive radio blocks from the secondary apparatus. The same interconnection can also be used to carry management traffic, in which case a mechanism such as packet tagging could be used to keep the management traffic separated from the radio blocks.

Radio blocks that are received by the primary and secondary apparatus over the aggregated wireless communication links are combined to recreate communication traffic streams in the primary apparatus for further transmission in a core or access network. As noted above, radio blocks are generated sequentially in some embodiments, and sequence numbers can be used in the radio blocks to maintain their correct sequential order when rebuilding originally received communication traffic from which those radio blocks were generated.

The bandwidth aggregation techniques proposed herein enable higher bandwidth to be provided by using multiple lower bandwidth wireless communication links. All communication traffic is processed in the primary apparatus, which in some embodiments ensures that the traffic is load balanced over the multiple wireless communication links independent of the actual content of the traffic.

A primary apparatus could also track secondary apparatus functional information to determine the availability of the secondary link bandwidth and radio operational characteristics. The primary and secondary apparatus may operate at the same or different wireless throughputs. A measure of redundancy protection may also be provided. A wireless error monitoring capability for the secondary link(s), for example, may enable faster rerouting of radio blocks when a secondary wireless communication link fails. Such monitoring might actually be implemented in a secondary apparatus or in a primary apparatus. The primary apparatus could potentially run multiple monitors, including one for its own wireless communication link and another for each secondary wireless communication link. The block combiner 78 (FIG. 3), for instance, could declare an error or failure of a secondary wireless communication link when it does not receive any radio blocks from that link within a certain period of time.

What has been described is merely illustrative of the application of principles of embodiments of the invention. Other arrangements and methods can be implemented by those skilled in the art without departing from the scope of the present invention.

For example, the division of functions shown in FIG. 3 is illustrative of an embodiment of the invention. Further, fewer, or different elements may be used to implement the techniques disclosed herein. Block generation, distribution, and combining could potentially be performed by a single physical component, for instance.

In addition, although described primarily in the context of methods and systems, other implementations of the invention are also contemplated, as instructions stored on a computer-readable medium, for example.

The invention claimed is:

1. An apparatus comprising:
   an interface that enables communication of communication traffic blocks over a first wireless communication link; and
   a block transfer module, operatively coupled to the interface, that enables transfer of communication traffic blocks between the apparatus and a further apparatus over a further communication link, the communication traffic blocks and further communication traffic blocks that are communicated over a second wireless communication link associated with the further apparatus together comprising communication traffic of a communication traffic stream,
   wherein the block transfer module receives communication traffic blocks from the further apparatus, the communication traffic blocks comprising fixed-length blocks generated from communication traffic received by the further apparatus,
   wherein the communication traffic blocks received from the further apparatus comprise communication traffic blocks distributed to the apparatus by the further apparatus independently of content of the received communication traffic.

2. A method comprising:
   communicating communication traffic blocks over a first wireless communication link associated with a first communication apparatus; and
   transferring the communication traffic blocks between the first communication apparatus and a second communication apparatus over a further communication link, the communication traffic blocks and further communication traffic blocks that are communicated over a second wireless communication link associated with the second communication apparatus together comprising communication traffic of a communication traffic stream,
   wherein transferring comprises receiving communication traffic blocks at the first communication apparatus from the second communication apparatus, the received communication traffic blocks comprising fixed-length blocks generated from communication traffic received by the second communication apparatus over a communication link,
   wherein the communication traffic blocks received by the first communication apparatus from the second communication apparatus comprise communication traffic blocks distributed to the second communication apparatus by the first communication apparatus independently of content of the received communication traffic.

3. The apparatus of claim 1,
   wherein the communication traffic blocks received from the further apparatus comprise communication traffic received by the further apparatus over a communication link,
   wherein the communication link and the further communication link are of the same type.

4. The apparatus of claim 3, wherein the communication link and the further communication link comprise respective Ethernet links.

5. The apparatus of claim 4, wherein the block transfer module receives the communication traffic blocks from the apparatus encapsulated into Ethernet frames.

6. The apparatus of claim 1,
   wherein each of the communication traffic blocks received from the further apparatus comprises a unique identifier.

7. The apparatus of claim 1,
   wherein the communication traffic blocks received from the further apparatus comprise communication traffic blocks distributed to the apparatus by the further apparatus to load balance transmission of the received communication traffic over the first and second wireless communication links independently of content of the received communication traffic.

8. The apparatus of claim 1, further comprising:
   an apparatus interface, operatively coupled to the block transfer module, that enables communications with the further apparatus over the further communication link,
   wherein the apparatus interface further enables exchange of management traffic between the apparatus and the further apparatus.

9. The apparatus of claim 1,
   wherein the communication traffic blocks received from the further apparatus comprise communication traffic blocks distributed to the apparatus by the further apparatus based on an operational status of each of the first and second wireless communication links.

10. The apparatus of claim 1,
    wherein the second wireless communication link comprises a primary wireless communication link and the further apparatus comprises a primary apparatus,
    wherein the first wireless communication link comprises one of a plurality of secondary wireless communication links, each secondary wireless communication link being associated with a respective secondary apparatus,
    wherein the interface enables the apparatus to receive communication traffic blocks distributed by the primary apparatus to the plurality of secondary wireless communication links,
    the apparatus further comprising:
    a second interface that enables communication of communication traffic blocks, that are distributed by the apparatus to secondary wireless communication links other than the first wireless communication link associated with the apparatus, to the respective secondary apparatus with which each of the secondary wireless communication links other than the first wireless communication link is associated.

11. The apparatus of claim 1, wherein the block transfer module further enables communication traffic blocks received by the apparatus over the first wireless communication link to be transferred from the apparatus to the further apparatus.

12. The method of claim 2, wherein the further communication link comprises an Ethernet link.

13. The method of claim 12, wherein transferring comprises encapsulating the communication traffic blocks into Ethernet frames for transfer over the further communication link.

14. The method of claim 2,
wherein each of the communication traffic blocks received from the second communication apparatus comprises a unique identifier.

15. The method of claim 2,
wherein the communication traffic blocks received from the second communication apparatus comprise communication traffic blocks distributed to the first communication apparatus by the second communication apparatus to load balance transmission of the received communication traffic over the first and second wireless communication links independently of content of the received communication traffic.

16. The method of claim 2,
wherein the second wireless communication link comprises a primary wireless communication link and the second communication apparatus comprises a primary apparatus,
wherein the first wireless communication link comprises one of a plurality of secondary wireless communication links, each secondary wireless communication link being associated with a respective secondary apparatus,
wherein transferring comprises receiving, at the first communication apparatus, communication traffic blocks distributed by the primary apparatus to the plurality of secondary wireless communication links,
the method further comprising:
transferring communication traffic blocks, that are distributed by the primary apparatus to secondary wireless communication links other than the first wireless communication link, to the respective secondary apparatus with which each of the secondary wireless communication links other than the first wireless communication link is associated.

17. The method of claim 2, wherein transferring further comprises transferring communication traffic blocks received by the first communication apparatus over the first wireless communication link from the first communication apparatus to the second communication apparatus.

18. The method of claim 2, further comprising:
configuring one of the first and second communication apparatus for operation in a primary operating mode;
configuring the other of the first and second communication apparatus for operation in a secondary operating mode; and
adjusting the configurations of the first and second communication apparatus, to configure the one of the first and second communication apparatus for operation in the secondary operating mode and to configure the other of the first and second communication apparatus in the primary operating mode,
wherein the first communication apparatus, when configured in the primary operating mode, receives communication traffic, generates fixed-length communication traffic blocks comprising the received communication traffic, distributes the communication traffic blocks independently of content of the received communication traffic between the first and second wireless communication links for transmission, transmits the communication traffic blocks that are distributed to the first wireless communication link over the first wireless communication link, and transfers the communication traffic blocks that are distributed to the second wireless communication link to the second communication apparatus over the further communication link,
wherein the first communication apparatus, when configured in the secondary operating mode, receives communication traffic blocks that are distributed to the first wireless communication link by the second communication apparatus over the further communication link and transmits the received communication traffic blocks over the first wireless communication link,
wherein the second communication apparatus, when configured in the primary operating mode, receives communication traffic, generates fixed-length communication traffic blocks comprising the received communication traffic, distributes the communication traffic blocks independently of content of the received communication traffic between the first and second wireless communication links for transmission, transmits the communication traffic blocks that are distributed to the second wireless communication link over the second wireless communication link, and transfers the communication traffic blocks that are distributed to the first wireless communication link to the first communication apparatus over the further communication link,
wherein the second communication apparatus, when configured in the secondary operating mode, receives communication traffic blocks that are distributed to the second wireless communication link by the first communication apparatus over the further communication link and transmits the received communication traffic blocks over the second wireless communication link.

* * * * *